(12) United States Patent
Becze et al.

(10) Patent No.: US 9,735,465 B2
(45) Date of Patent: Aug. 15, 2017

(54) MOTOR FEED ANTENNA FOR VEHICLE

(71) Applicant: Qualcomm Incorporated, San Diego, CA (US)

(72) Inventors: Karoly Becze, Escondido, CA (US); Vincent Martin Kemler, San Diego, CA (US); Randy Edward Standke, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 14/804,170

(22) Filed: Jul. 20, 2015

(65) Prior Publication Data
US 2017/0025744 A1   Jan. 26, 2017

(51) Int. Cl.
*H01Q 1/28* (2006.01)
*B64C 39/02* (2006.01)
*H01Q 1/46* (2006.01)

(52) U.S. Cl.
CPC ............ *H01Q 1/28* (2013.01); *B64C 39/024* (2013.01); *H01Q 1/286* (2013.01); *H01Q 1/46* (2013.01); *B64C 2201/027* (2013.01); *B64C 2201/042* (2013.01); *B64C 2201/122* (2013.01); *B64C 2201/16* (2013.01)

(58) Field of Classification Search
CPC ........ B64C 2201/042; B64C 2201/122; B64C 2201/16; B64C 39/024; B64C 2201/027; B64C 2201/066; B64C 2201/141; B64C 2201/024; H01Q 1/28; H01Q 1/46; H01Q 1/286
See application file for complete search history.

(56) References Cited

U.S. PATENT DOCUMENTS

| 6,977,618 | B1* | 12/2005 | Hanewinkel, III | .. H01Q 1/1235 343/705 |
| 7,318,564 | B1* | 1/2008 | Marshall | ............. B60L 11/1822 191/10 |
| 7,333,050 | B2 | 2/2008 | Svy et al. | |
| 7,525,498 | B2 | 4/2009 | Quan et al. | |
| 8,633,616 | B2 | 1/2014 | Soar | |

(Continued)

FOREIGN PATENT DOCUMENTS

| WO | 2013109247 A1 | 7/2013 |
| WO | 2014156263 A1 | 10/2014 |
| WO | WO-2014197613 A2 | 12/2014 |

OTHER PUBLICATIONS

International Search Report and Written Opinion—PCT/US2016/033839—ISA/EPO—Jul. 29, 2016.

(Continued)

*Primary Examiner* — Tho G Phan
(74) *Attorney, Agent, or Firm* — Foley & Lardner LLP

(57) ABSTRACT

According to some embodiments, an unmanned vehicle includes a power supply configured to supply an electrical power signal to a motor for propelling the unmanned vehicle, a wireless communication device configured to transmit or receive a radio frequency (RF) signal, and a motor feed antenna coupled to the power supply and the wireless communication device, the motor feed antenna configured to conduct the electrical power signal from the power supply to the motor, and to transmit or receive RF signals as an antenna for the wireless communication device.

29 Claims, 6 Drawing Sheets

(56) References Cited

U.S. PATENT DOCUMENTS

| | | |
|---|---|---|
| 8,922,297 B2 | 12/2014 | Stoneback et al. |
| 2010/0045544 A1 | 2/2010 | Maurel et al. |
| 2010/0298957 A1 | 11/2010 | Sanchez Rocha et al. |
| 2012/0091284 A1* | 4/2012 | Goodarzi .............. B64C 39/024 244/23 A |
| 2014/0099853 A1 | 4/2014 | Condon et al. |
| 2014/0159652 A1 | 6/2014 | Hall et al. |
| 2014/0304107 A1 | 10/2014 | McAllister |
| 2015/0246727 A1* | 9/2015 | Masticola ............. B64C 39/024 701/2 |
| 2015/0276353 A1* | 10/2015 | Ueno ........................ F41H 7/04 244/2 |
| 2017/0015416 A1* | 1/2017 | O'Connor ............. B64C 39/024 |
| 2017/0115660 A1* | 4/2017 | Caubel ................. G05D 1/0022 |

OTHER PUBLICATIONS

Hardware AR.Drone, "Crash Landing Help," AR.Drone International Forums, 2011, 3 pages.

* cited by examiner

MOTOR FEED ANTENNA FOR VEHICLE

BACKGROUND

1. Field

Subject matter described herein relates generally to vehicles with wireless communication capabilities and, in particular embodiments, to unmanned aerial vehicles (UAVs) having motor feeds that are also utilized as wireless radio frequency (RF) antennas.

2. Background

As unmanned vehicles (UVs) become increasingly popular for military, commercial, and recreational use, variations of designs of the UVs have been developed. As development proceeds, UVs having smaller sizes or form factors and that are lighter in weight are contemplated. However, while efforts are made to reduce the size and weight of these UVs, the UVs may still need to accommodate one or more wireless antennae of sufficient size to support wireless communications. In addition, in instances where a UV having a small form factor results in a close proximity between a wireless antenna and traces for supplying power to motors of the UV, such power supply traces may adversely interfere with the antenna's RF signal radiation performance.

SUMMARY

In general, embodiments relate to systems and methods that employ electrical conductor traces on an unmanned or manned vehicle (such as, but not limited to, an unmanned aerial vehicle (UAV)) that are used both for conducting power to motors of the UAV and for receiving or emitting radio frequency signals as an antenna for wireless radio communication.

According to various embodiments, there is provided an unmanned vehicle including a power supply configured to supply an electrical power signal to a motor for propelling the unmanned vehicle; a wireless communication device configured to transmit or receive a radio frequency (RF) signal; and a motor feed antenna coupled to the power supply and the wireless communication device, the motor feed antenna configured to conduct the electrical power signal from the power supply to the motor, and to transmit or receive RF signals as an antenna for the wireless communication device.

In some embodiments, the motor feed antenna includes at least one conductive trace having a first end coupled to both the power supply and the wireless communication device, and a second end coupled to the motor.

In some embodiments, a length of the at least one conductive trace is selected based on a frequency of the RF signals.

In some embodiments, the motor feed antenna further includes at least one trap coupled between the at least one conductive trace and the motor, the at least one trap configured to allow the electrical power signal to pass to the motor and to block an RF signal transmitted by the wireless communication device from passing to the motor.

In some embodiments, the at least one trap includes an inductor.

In some embodiments, the at least one trap includes a capacitor connected in parallel with the inductor.

In some embodiments, the motor feed antenna further includes at least one trap coupled between the at least one conductive trace and the power supply, the at least one trap configured to allow the electrical power signal to pass to the at least one conductive trace and to block an RF signal received by the motor feed antenna from passing to the power supply.

In some embodiments, at least one conductive trace is further directly coupled to a coil of the motor such that the coil of the motor and the at least one conductive trace of the motor feed antenna are together configured to transmit or receive the RF signals as the antenna for the wireless communication device.

In some embodiments, the motor feed antenna further includes an RF signal feed coupled between the at least one conductive trace and the wireless communication device, the RF signal feed configured to allow an RF signal transmitted by the wireless communication device to pass and to block the electrical power signal from passing to the wireless communication device.

In some embodiments, the RF signal feed includes a capacitor.

In some embodiments, the motor feed antenna further includes an impedance matching circuit coupled between the RF signal feed and the wireless communication device, the impedance matching circuit including an inductor and a capacitor connected in parallel.

In some embodiments, a combined length of the at least one conductive trace and the RF signal feed is selected based on a frequency of the RF signals.

In some embodiments, the electrical power signal is a differential direct current (DC) power signal having a high level DC signal component and a low level DC signal component.

In some embodiments, the motor feed antenna includes at least one conductive trace having a first end coupled to both the power supply and the wireless communication device, and a second end coupled to the motor; the at least one conductive trace includes a plurality of conductive traces, each of the conductive traces having a first end coupled to both the power supply and the wireless communication device, and a second end coupled to the motor; and a first trace of the conductive traces is configured to deliver the high level DC signal component to the motor, and a second trace of the conductive traces is configured to deliver the low level DC signal component to the motor.

In some embodiments, the wireless communication device is configured to transmit or receive a plurality of RF signals, and each of the RF signals corresponds to a different frequency band.

In some embodiments, the unmanned vehicle further includes a main body for housing the power supply and the wireless communication device; a propeller configured to be driven by the motor; and an arm for supporting the motor feed antenna, the arm having a first end attached to the main body and a second end attached to the motor.

In various embodiments, there is provided a method of manufacturing an unmanned vehicle, the method including: supporting a power supply on a body of the unmanned vehicle, the power supply configured to supply an electrical power signal to a motor for propelling the unmanned vehicle; supporting a wireless communication device on the body of the unmanned vehicle, the wireless communication device configured to transmit or receive a radio frequency (RF) signal; and coupling a motor feed antenna to the power supply and the wireless communication device, the motor feed antenna configured to conduct the electrical power signal from the power supply to the motor, and to transmit or receive RF signals as an antenna for the wireless communication device.

In some embodiments, the motor feed antenna includes at least one conductive trace having a first end coupled to both the power supply and the wireless communication device, and a second end coupled to the motor.

In some embodiments, a length of the at least one conductive trace is selected based on a frequency of the RF signals.

In some embodiments, the method further includes connecting at least one trap between the at least one conductive trace and the motor, the at least one trap configured to allow the electrical power signal to pass to the motor and to block an RF signal transmitted by the wireless communication device from passing to the motor.

In some embodiments, the method further includes connecting at least one trap between the at least one conductive trace and the power supply, the at least one trap configured to allow the electrical power signal to pass to the at least one conductive trace and to block an RF signal received by the motor feed antenna from passing to the power supply.

In some embodiments, the method further includes directly coupling a coil of the motor to the at least one conductive trace such that the coil of the motor such that the coil of the motor and the at least one conductive trace of the motor feed antenna are together configured to transmit or receive the RF signals as the antenna for the wireless communication device.

In some embodiments, the method further includes connecting an RF signal feed between the at least one conductive trace and the wireless communication device, the RF signal feed configured to allow an RF signal transmitted by the wireless communication device to pass and to block the electrical power signal from passing to the wireless communication device.

In some embodiments, the method further includes coupling an impedance matching circuit between the RF signal feed and the wireless communication device, the impedance matching circuit including an inductor and a capacitor connected in parallel.

In some embodiments, a combined length of the at least one conductive trace and the RF signal feed is selected based on a frequency of the RF signals.

In some embodiments, the electrical power signal is a differential direct current (DC) power signal having a high level DC signal component and a low level DC signal component.

In some embodiments, the motor feed antenna includes at least one conductive trace having a first end coupled to both the power supply and the wireless communication device, and a second end coupled to the motor; the at least one conductive trace includes a plurality of conductive traces, each of the conductive traces having a first end coupled to both the power supply and the wireless communication device, and a second end coupled to the motor; and a first trace of the conductive traces is configured to deliver the high level DC signal component to the motor, and a second trace of the conductive traces is configured to deliver the low level DC signal component to the motor.

DETAILED DESCRIPTION

In general, various embodiments relate to apparatuses and methods of manufacturing associated with motor feed conductors of vehicles and, in some embodiments, for unmanned vehicles (UVs) capable of travelling by ground, water, and/or air. Further embodiments relate to unmanned aerial vehicles (UAVs) having motor feed conductors that are also configured and connected as wireless radio frequency (RF) antennas.

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well-known structures and components are shown in block diagram form in order to avoid obscuring such concepts.

Embodiments described herein can provide various benefits, including configurations that allow for reductions in size, form factor, and/or weight of a UAV (or other UV). Some embodiments described herein may provide greater performance of a wireless antenna at a UAV or may provide a UAV with additional or improved performance capabilities and uses.

Figure 1:
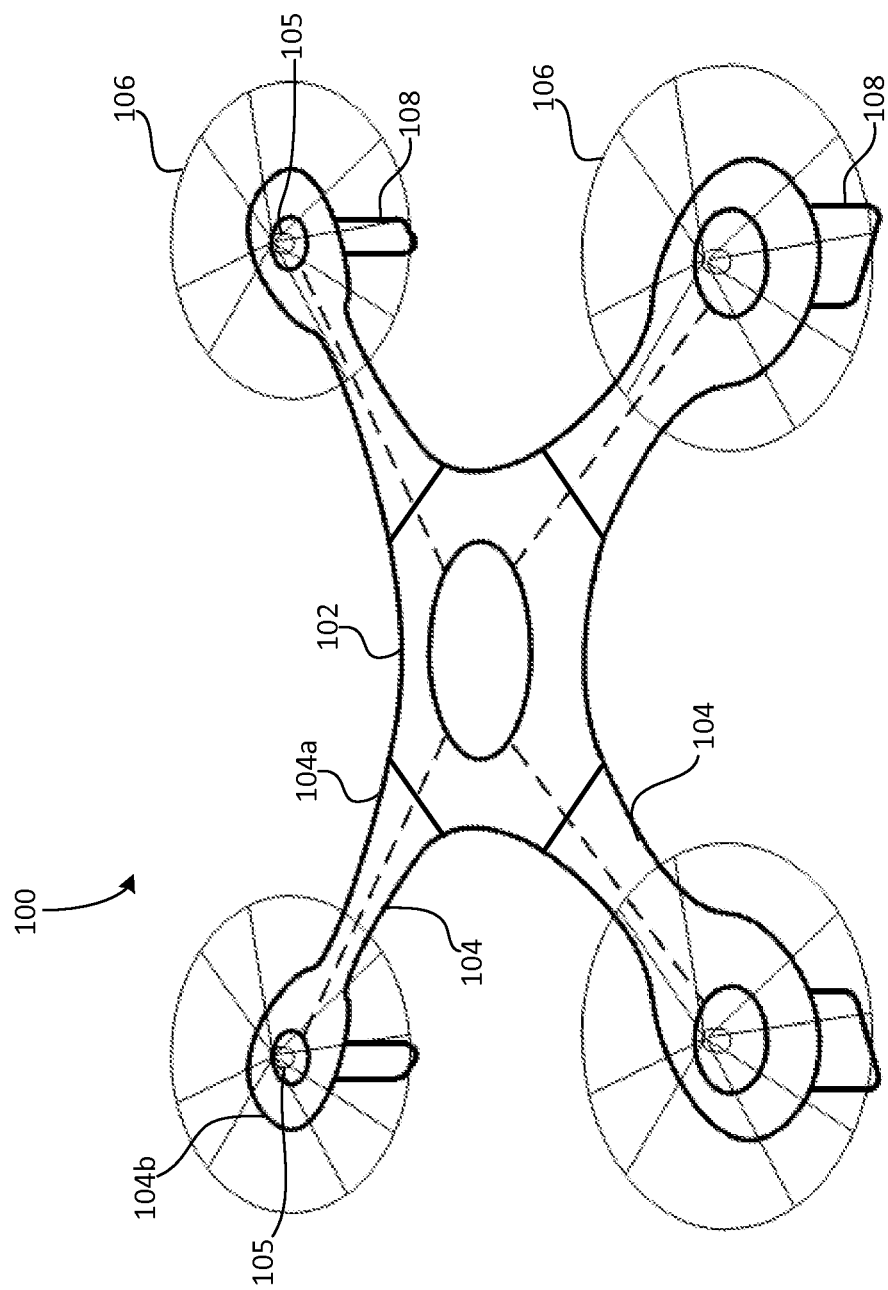
FIG. 1 illustrates a perspective view of an example of an unmanned aerial vehicle according to various embodiments.

FIG. 1 illustrates a perspective view of an example of an unmanned aerial vehicle 100 according to various embodiments. Referring to FIG. 1, the UAV 100 includes a main body 102. The UAV 100 further includes a plurality of extended portions or "arms" 104 that extend from the main body 102. Each of the arms 104 has a first end 104a that is attached to the main body 102. Although some embodiments include four arms 104 extending from the main body 102, in other embodiments, UAVs may include any suitable number of arms. For example, further embodiments may include or employ a UAV having one arm, two arms, three arms, or more than four arms. Other embodiments may include or employ a UAV having no arms, for example, that is configured as a helicopter-style UAV or a UAV having a propeller at its main body 102.

In some embodiments, the UAV 100 includes a propeller 106 at a second end 104b of each arm 104, opposite the first arm end 104a. The propellers 106 are configured to provide aerial propulsion to the UAV 100 such that the UAV 100 is capable of flight and maneuvering during flight. In some embodiments, the propellers 106 are located on top of the arms 104, at the second ends 104b of the arms 104. In addition, the UAV 100 may have a plurality of legs 108, including a leg 108 at the bottom of each arm 104. The legs 108 support the UAV 100 in an upright or standing orientation, when the UAV 100 is on the ground and not in flight. In other embodiments, the propellers 106 may be provided at other suitable locations, such as, but not limited to, the end surface or the bottom of each of the arms. Each propeller 106 may be coupled to a respective motor 105. Each motor 105 may include a rotor. The motors 105 are configured to drive and spin the propellers 106 at speeds sufficient to achieve aerial propulsion of the UAV 100.

The main body 102 and the arms 104 of the UAV may be made of any suitable materials, including, but not limited to plastic, metal, wood, ceramic, composite material, or combinations thereof. In particular embodiments, at least a portion of (or the entire) structure of one or more (or each) arm 104 is composed of a circuit board material or substrate, on which one or more electrically conductive traces or other electrical circuit components are formed. In further embodiments, at least a portion of the main body 102 is composed of a circuit board material or substrate.

Although the UAV 100 may include propellers 106 in some embodiments, other embodiments employ other suitable aerial propulsion systems including, but not limited to, a ducted fan system, a jet engine system, and/or the like. Although some embodiments of the UAV 100 have a multi-arm configuration, other embodiments may include or operate with other UAV configurations, such as, but not limited to, helicopter-style UAVs, airplane-style UAVs (e.g., fixed-winged UAVs), zeppelin or blimp-style UAVs, and/or other multicopter-style UAVs. Also, while some embodiments are described herein with reference to UAVs, other embodiments may include or employ other types of aerial vehicles, including manned vehicles. In addition, some embodiments of UVs may be capable of travel by land and/or water instead of, or in addition to, aerial travel.

Figure 2:
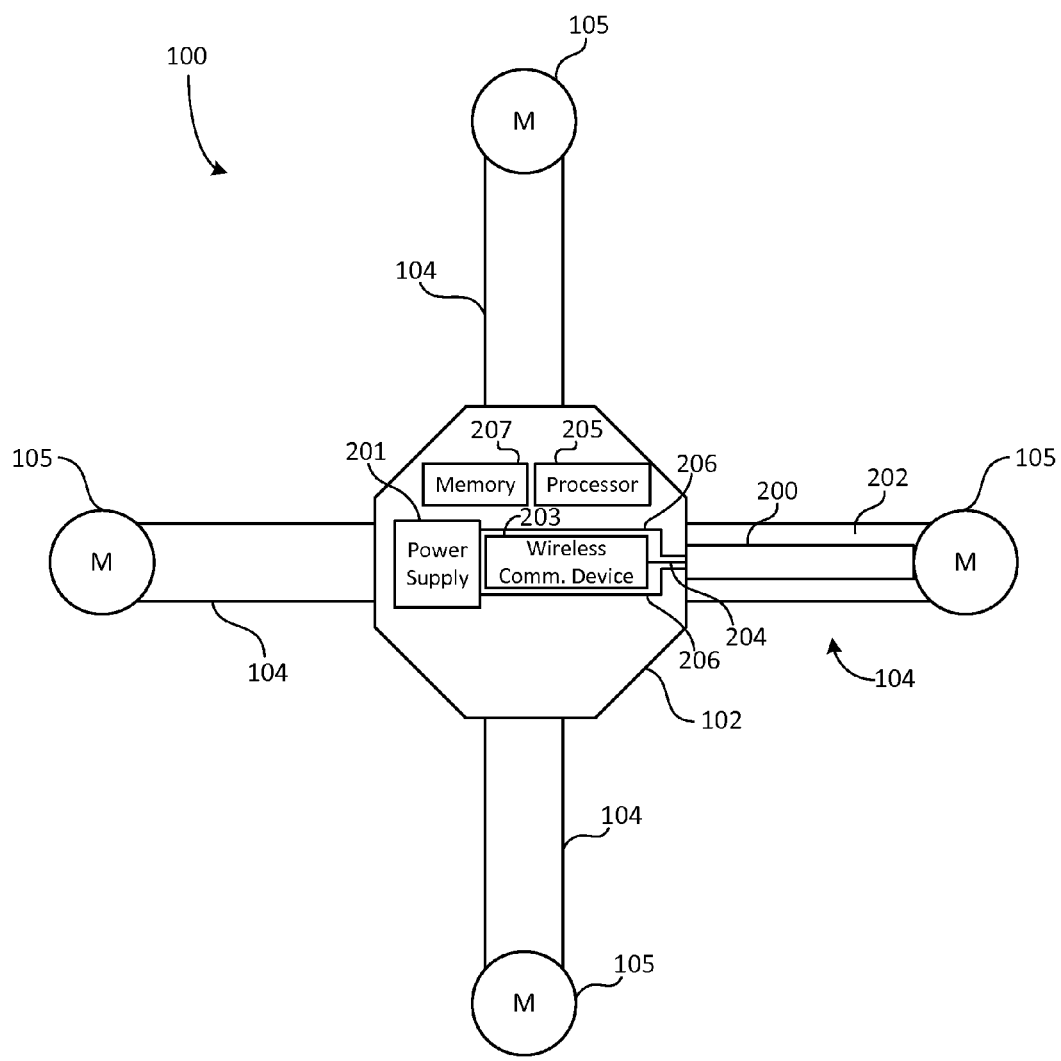
FIG. 2 illustrates a top view of an example of an unmanned aerial vehicle according to various embodiments.

FIG. 2 is a schematic diagram of a top view of the unmanned aerial vehicle 100, according to certain example embodiments. Referring to FIGS. 1-2, one or more (or each) of the arms 104 of the UAV 100 may include a motor feed antenna 200. In particular embodiments, one or more (or each) of the arms 104 of the UAV 100 may be composed of a circuit board substrate, such as, but not limited to, a printed circuit board (PCB) 202 upon which the motor feed antenna 200 is formed. In other embodiments, one or more (or each) of the arms 104 may be made of any other suitable dielectric or substrate upon which conductive traces and electrical components may be formed. In yet other embodiments, the one or more (or each) of the arms 104 is made of other suitable material, such as, but not limited to, metal, plastic, wood, ceramic, composite material or a combination thereof, on which a PCB is attached.

In particular embodiments, the main body 102 includes a housing, frame or combination thereof that contains or holds a power supply 201, a wireless communication device 203, a processor 205, a memory device 207, and/or other components. In some embodiments, the wireless communication device 203 includes a receiver, a transmitter, or a transceiver, corresponding to a particular RF band, for communication in a wireless communication network. Examples of a wireless communication device 203 include, but are not limited to, a wireless local area network (WLAN) device, a wireless wide area network (WWAN) device, a personal area network (PAN) device, and/or the like. The wireless communication device 203 may be configured to facilitate wireless communication between the UAV 100 and other devices separate from the UAV 100.

Each motor 105 may be any suitable electrical motor that produces a rotational force to rotate a propeller 106, including, but not limited to, a direct current (DC) electric rotary motor or a brushless DC electric motor. According to various embodiments, the motor feed antenna 200 is coupled between an electrical power supply 201 and one of the motors 105 of the UAV 100. The motor feed antenna 200 may be coupled to the power supply 201 via a power transmission line 206 that is configured to suitably (e.g., with minimal power dissipation) transmit the power generated at the power supply 201 to the motor feed antenna 200. According to some embodiments, the motor feed antenna 200 is configured to transmit power from the power supply 201 of the UAV 100 (via the power transmission line) to one of the motors 105 to power the motor 105 to drive the corresponding propeller 106 of the UAV 100.

According to some embodiments, the power supply 201 may be a DC power supply, such as, but not limited, a DC battery (re-chargeable or non-rechargeable). In some embodiments, the DC power supply 201 may supply differential signals to the motors 105 via the motor feed antenna 200. For example, the power supply 201 may supply two complementary DC signals: a high-level DC signal (e.g., DC+) and a low-level DC signal (e.g., DC−). In addition, the DC power may be transmitted using pulse width modulation (PWM) at a low frequency (e.g., at the kilohertz level). In other embodiments, the power supply 201 may provide unmodulated (e.g., zero frequency) DC current to power the motors. In further embodiments, the power supply 201 may be an alternating current (AC) power supply.

In addition, according to some embodiments, the motor feed antenna 200 also provides an RF wireless antenna for transmitting and receiving radio signals (e.g., for wireless communication with other wireless devices separate from the UAV 100).

The UAV 100 may include an RF signal transmission line 204 for conducting signals from the wireless communication device 203 to the motor feed antenna 200 and/or for conducting signals from the motor feed antenna 200 to the wireless communication device 203. According to some embodiments, the RF signal transmission line 204 may include conductive wiring or other conductors and/or circuitry that is shielded or otherwise configured for minimizing or preventing the RF signal transmission line 204 from leaking the RF signals undergoing transmission to the outside of the RF signal transmission line 204. Similarly, the RF signal transmission line 204 may be shielded or otherwise configured to minimize or prevent the RF signal transmission line 204 from receiving external RF signals (e.g., signals that may interfere with the RF signals undergoing transmission). As such, the RF signal transmission line 204 is provided for allowing the motor feed antenna 200 to exchange signals with the wireless communication device 203, where the RF signal transmission line 204, itself, has substantially no effective wireless RF signal transmitting and receiving capabilities. In other words, the RF signal transmission line 204 may be shielded or otherwise configured to prevent wireless radiation from being received (wirelessly) directly into or radiated (wirelessly) directly from the RF signal transmission line 204, while allowing conductive communication of signals between the motor feed antenna 200 and the wireless communication device 203, through the RF signal transmission line 204.

On the other hand, the motor feed antenna 200 is configured to transmit and receive wireless RF signals. For example, the motor feed antenna 200 is configured to radiate RF signals supplied by the RF signal transmission line 204 to the environment outside of the motor feed antenna 200, and/or to receive RF signals from the environment outside of the motor feed antenna 200. In some embodiments, the motor feed antenna 200 is configured to transmit and receive Wi-Fi signals (e.g., signals corresponding to 2.4 GHz or 5 GHz radio bands), wirelessly. However, in other embodiments, the motor feed antenna 200 may be configured to transmit and receive, wirelessly, any band of RF signals, as desired. In some embodiments, the motor feed antenna 200 may be configured to only receive (but not transmit) RF or other wireless signals from the environment outside of the motor feed antenna 200. In other embodiments, the motor feed antenna 200 may be configured to only transmit (but not receive) RF or other wireless signals into the environment outside of the motor feed antenna 200. In further embodiments, the motor feed antenna 200 may be configured to radiate and/or receive a plurality of RF signals of a plurality of different frequency bands, such as, but not limited to, RF signals at both 2.4 GHz and 5 GHz or RF signals at any other suitable combination of different frequency bands. In other embodiments, in addition to, or instead of, local connectivity, the motor feed antenna 200 may be configured to radiate and/or receive wide area network signals such as, but not limited to, Long-Term Evolution (LTE), Code Division Multiple Access (CDMA), Wideband Code Division Multiple Access (WCDMA), Global Systems for Mobile Communications (GSM), and/or any other suitable wide area network protocol.

As such, in some embodiments, the length of the motor feed antenna 200 of the UAV 100 may be selected to correspond to the RF signal band or RF signal bands that are to be received and transmitted at the motor feed antenna 200. For example, in some embodiments where the motor feed antenna 200 is for transmitting and receiving RF signals at the 2.4 GHz band, the length of the motor feed antenna 200 may be within the range of about 15 mm to about 35 mm, and, in particular embodiments, is about 23 mm. In some embodiments, a separate antenna from the motor feed antenna 200 may additionally be provided on the UAV 100, and the separate antenna may be tuned to transmit and/or receive a different band of RF signals from that of the motor feed antenna 200. For example, the motor feed antenna 200 may be tuned for Wi-Fi RF signals (e.g., 2.4 GHz RF signals) and the separate antenna may be tuned for Global Positioning System (GPS) RF signals (e.g., 1.57 GHz RF signals).

According to some embodiments, the UAV 100 may further include the processor 205 and the memory device 207. The processor 205 and the memory device 207 may operate with each other to store and run software related to controlling the operation of the UAV 100. For example, the processor 205 may process software and/or data stored on the memory device 207, where such software may control the processor to perform wireless communication with another device external to the UAV 100, using the wireless communication device 203 and the motor feed antenna 200. In some embodiments, the processor 205 may be connected to the wireless communication device 203 for processing RF signals received by the wireless communication device 203. In other embodiments, the processor 205 may be directly connected to the motor feed antenna 200 via the RF signal transmission line 204, without the wireless communication device 203 connected between those components.

According to some embodiments, the processor 205 may be a general-purpose processor. The general-purpose processor 205 may include any suitable data processing device, such as, but not limited to, a microprocessor. In the alternative, the general-purpose processor 205 may be any suitable electronic processor, controller, microcontroller, or state machine. The general-purpose processor 205 may also be implemented as a combination of computing devices (e.g., a combination of a digital signal processor (DSP) and a microprocessor, a plurality of microprocessors, at least one microprocessor in conjunction with a DSP core, or any other such configuration).

The memory device 207 may be a non-transitory processor-readable storage medium that stores processor-executable instructions. The memory device 207 may include any suitable internal or external device for storing software and data. Examples of the memory device 207 may include, but are not limited to, random access memory (RAM), read only memory (ROM), floppy disks, hard disks, dongles, or other recomp sensor board (RSB) connected memory devices, or the like. The memory device 207 may store an operating system (OS), user application software, and/or executable instructions. The memory device 207 may also store application data, such as an array data structure.

Figure 3:
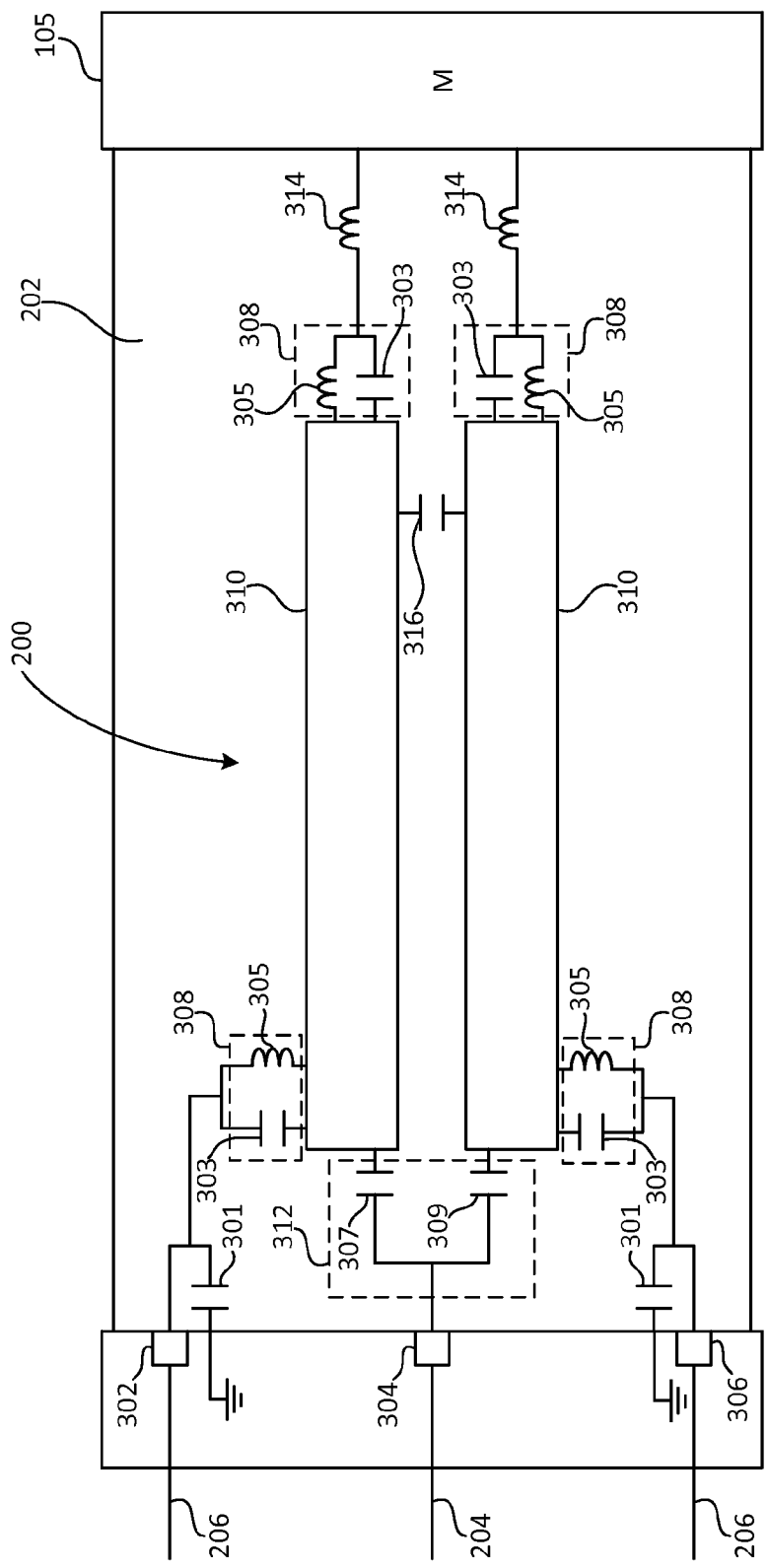
FIG. 3 illustrates a schematic view of an example of a motor feed antenna according to various embodiments.

FIG. 3 illustrates a schematic view of an example of the motor feed antenna 200 according to various embodiments. Referring to FIGS. 1-3, power supply ports 302 and 306 and an RF signal port 304 are provided at a first end of the motor feed antenna 200, proximate the main body 102 of the UAV 100. The power supply ports 302 and 306 are connected to the differential output of the power supply (power supply 201). At each of the power supply ports 302 and 306, a capacitor 301 may be coupled to each of the power supply ports 302. In some embodiments, the capacitors 301 may be connected to ground. The capacitors 301 may provide a low impedance shunt to ground for the high frequency RF signals, while having a negligible effect (e.g., having a high impedance) at DC or low frequencies (e.g., at the kilohertz level). For example, a 100 pF capacitor will have an impedance of less than 1 ohm at 2.4 GHz and an impedance of more than 7000 ohms at 20 kHz. According to some embodiments, the power supply 201 may supply differential DC power to the motor feed antenna 200 via the two power supply ports 302 and 306. For example, the power supply 201 may supply a high level DC+ signal through power supply port 302 and may supply a low level DC− signal through power supply port 306.

The motor feed antenna 200, which includes the two conductive traces 310, carries the two differential DC power signals to the motor 105 of the UAV 100, where one conductive trace 310 is for carrying the DC+ signal and another conductive trace 310 is for carrying the DC− signal. In other embodiments, the motor feed antenna 200 may include any suitable number of conductive traces 310 and power supply ports 302 and 306 for supplying power to the motor 105. For example, in UAV designs including a power supply 201 for supplying single-ended power, as opposed to differential power, a single power supply port 302 feeding a single conductive trace 310 may be used. As another example, the power supply 201 may supply AC power, and the motor feed antenna 200 may include any suitable number of conductive traces 310 being fed by any suitable number of power supply ports 302, as needed by the AC power supply. Other embodiments may include more than two power supply ports 302 feeding more than two conductive traces 310.

In some embodiments, the RF signal port 304 may be connected to the wireless communication device 203, via the RF signal transmission line 204. Accordingly, the wireless communication device 203 may supply RF signals to the motor feed antenna 200, via the RF signal port 304. Likewise, the wireless communication device 203 may receive RF signals from the motor feed antenna 200, via the RF signal port 304.

According to some embodiments, the motor feed antenna 200 further includes one or more (or a plurality of) traps 308 for passing the relatively low frequency DC power signals and for substantially blocking the relatively high frequency RF signals. In some embodiments, each conductive trace 310 is electrically coupled to a trap 308 at a first end of the conductive trace 310, proximate the power supply ports 302 and 306. In addition, each conductive trace 310 is also coupled to another trap 308 at a second end of the conductive trace 310 proximate the motor 105 and opposite the first end of the conductive trace 310. By locating traps 308 between the power supply ports 302 and 306 and the conductive traces 310, and between the conductive traces 310 and the motor 105, power (e.g., the DC power) can be delivered from the power supply ports 302 and 306 to the motor 105 via the conductive traces 310, as the traps 308 are configured to pass the low frequency electrical power.

In addition, according to some embodiments, each conductive trace 310 is also coupled to an RF signal feed 312, which is coupled to the RF signal port 304. The RF signal feed 312 supplies the RF signal from the RF signal port 312 simultaneously to each of the conductive traces 310 (e.g., for wireless RF transmission from the conductive traces into the environment outside of the motor feed antenna 200). Similarly, the RF signal feed 312 supplies the RF signal from the conductive traces 310 to the RF signal port 312 (e.g., when the conductive traces 310 receive wireless RF signals from the environment outside of the motor feed antenna 200). In some embodiments, the RF signal feed 312 also forms part of the wireless antenna for receiving and transmitting RF signals, in addition to the conductive traces 310. Accordingly, in some embodiments, when tuning the length of the wireless antenna of the motor feed antenna 200 corresponding to desired RF signal frequency bands, the length including the RF signal feed 312 and the conductive traces 310 may be selected to correspond to the desired frequency band or frequency bands. For example, in some embodiments where the motor feed antenna 200 is configured for transmitting and receiving RF signals at the 2.4 GHz band, the antenna length including the length of the RF signal feed 312 and the length of the conductive traces 310 may total about 23 mm. In further embodiments, the antenna length of motor feed antenna 200 may be optimized for radiating and receiving signals of a plurality of different frequency bands (e.g., signals of 2.4 GHz and 5 GHz).

In other embodiments, the wireless antenna of the UAV 100 includes only the conductive trace 310, where the RF signal feed 312 is shielded or otherwise configured to minimize or prevent leaking RF signals or receiving RF signals via wireless radiation. Accordingly, in such other embodiments, when tuning the motor feed antenna 200 for particular RF bands, only the length of the conductive traces 310 may be selected (and the length of the RF signal feed 312 need not affect the tuning). For example, in embodiments where the motor feed antenna 200 is configured for transmitting and receiving RF signals at the 2.4 GHz band, the length of each of the conductive traces 310 may be about 23 mm.

According to some embodiments, as discussed above, because the traps 308 are also configured to block RF signals, the RF signal supplied at the RF signal port 304 will be blocked from being transmitted through the traps 308. For example, RF signals supplied from the RF signal port 304 will be transmitted to the conductive traces 310 via the RF signal feed 312, but will be blocked from being transmitted into the power supply ports 302 and 306 (by the traps 308 at the first ends of the conductive traces 310), and will be blocked from being transmitted into the motor 105 (by the traps 308 at the second ends of the conductive traces 310). Accordingly, the RF signals will be substantially isolated to the conductive traces 310 and to the RF signal feed 312.

Therefore, according to some embodiments, signals having low frequencies (e.g., DC power signals) may be supplied to the conductive traces 310 and pass to the motor 105, while signals having high frequencies (e.g., higher band RF signals) may be supplied to the RF signal feed 312 and to the conductive traces 310, but may be blocked at the traps 308 at the second ends of the conductive traces 310 from passing to the motor 105. As such, the high frequency signals may be isolated to the motor feed antenna 200.

According to some embodiments, each trap 308 may include an electrical circuit having a capacitor 303 and an inductor 305 connected in parallel with each other. In general, inductors 305 will pass low frequency signals and block high frequency signals. Therefore, because the DC power signal (e.g., pulse width modulated DC or unmodulated DC) has a sufficiently low frequency (relative to the RF signal), and because the RF signal (e.g., 2.4 GHz Wi-Fi signals) has a sufficiently high frequency (relative to the DC power signal), the inductor 305 of trap 308 can be selected or configured to pass the DC power and block the higher frequency RF signal. In general, the higher the value of the inductor 305, the better the blocking of the RF signal by the inductor 305 (e.g., a 1000 nH inductor 305 will block RF signals more effectively compared to a 10 nH inductor 305). However, in practice, higher value inductors 305 may exhibit self-resonance, which may adversely affect the performance of the inductor 305 in passing the DC power and in blocking the RF signals. According to some embodiments, by adding a capacitor 303 in parallel with the inductor 305 at the traps 308, the adverse effects of the self-resonance of the inductor 305 may be mitigated. As such, according to some embodiments, values of the inductors 305 and the capacitors 303 of the traps 308 may be selected in order to substantially block RF signals at a desired radio band while substantially passing supplied power to the motor 105, and to ensure that the self-resonance of the inductors 305 does not significantly adversely affect the performance of the traps 308 as filters.

In other embodiments, any suitable circuit configuration of the traps 308 for passing electrical power while blocking RF signals may be used. For example, in further embodiments, one or more (or each) trap 308 may include a single inductor (e.g., the inductor 305) without a capacitor 303. As discussed, in some embodiments, a capacitor 303 is connected in parallel with the inductor 305 at each trap 308. In such embodiments, the capacitor 303 may increase the isolation of the RF signals by utilizing a parallel resonance between the inductor 305 and the capacitor 303 of each trap 308. According to some embodiments, the parallel resonant traps 308 (e.g., the capacitor 303 and inductor 305 in parallel) may be tuned for optimizing isolation of RF signals (e.g., to the conductive traces 310 and to the RF signal feed 312), corresponding to one or more predefined frequency bands.

In addition to the traps 308, the motor feed antenna 200 may utilize further electrical components for enhancing isolation of the RF signals. For example, in some embodiments, an inductor 314 may be positioned between each trap 308 at the second end of the conductive traces 310 and the motor 105, to provide further impedance (in addition to the impedance supplied by the traps 308 at the second end of the conductive traces) to the high frequency RF signals. As such, the inductors 314 may provide further RF signal containment to the conductive traces 310 (e.g., such that the RF signal does not substantially travel into the motor 105, and such that the RF signal substantially remains at the conductive traces 310). In other embodiments, a plurality of inductors may be positioned (for example, at the locations of each inductor 314) between the traps 308 at the second end of the conductive traces 310 and the motor 105, to further increase the effective inductance of the trap 308, and to therefore increase the RF signal blocking performance of the traps 308. In some embodiments, the traps 308 may include prepackaged filters or chips configured to pass DC power and to block RF signals of a desired radio frequency band or frequency bands.

In particular embodiments, the RF signal feed 312 includes capacitors 307 and 309 (a pair of capacitors 307 and 309, each having one terminal connected to a respective conductive trace 310 and another terminal connected to the other capacitor 307 or 309 and the port 304). In general, in contrast to inductors, capacitors will pass high frequency signals and block low frequency signals. Therefore, because the RF signal (e.g., 2.4 GHz Wi-Fi signal) has a sufficiently high frequency (relative to the DC power signal), and the DC power signal (e.g., pulse width modulated DC or unmodulated DC) has a sufficiently low frequency (relative to the RF signal), the capacitors 307 and 309 of the RF signal feed 312 can be selected to pass the RF signal and block the DC power signal. As such, the capacitors 307 and 309 of the RF signal feed 312 allow the RF signals supplied from the RF signal port 304 to be transmitted to the conductive traces 310. Similarly, the capacitors 307 and 309 of the RF signal feed 312 allow the RF signals received at the conductive traces 310 to be transmitted to the RF signal port 304. At the same time, the capacitors 307 and 309 of the RF signal feed 312 serve to block the power signals transmitted from the power supply ports 302 and 306 to the motor 105 via the conductive traces 310 from leaking into the RF signal port 304. In some embodiments, one or more other capacitors 316 may be located between and connected to the two conductive traces 310 for passing the isolated RF signals between the conductive traces 310, and creating a dipole wireless antenna at the motor feed antenna 200. Thus, according to some embodiments, the RF signal transmission operates in common mode and the DC power transmission operates in differential mode, and thus, the performance of each does not affect the other.

According to some example embodiments, for effectively isolating RF signals in the 2.4 GHz range and for allowing DC power at a substantially lower frequency than 2.4 GHz to pass to the motor 105, the inductor 305 of each of the traps 308 may be about 10 nH and the capacitor 303 connected in parallel with the inductor 305 of each of the traps 308 may be about 0.3 pF. In addition, the capacitors 307 and 309 at the RF signal feed 312, the capacitor 316 located between the conductive traces 310, and the capacitors 301 located parallel to the DC power supply ports 302 and 306 may each have a value of about 100 pF for effectively passing the RF signals to the conductive traces 310 and for effectively blocking the DC power. However, in other embodiments, suitable values of inductors and capacitors in the motor feed antenna 200 may be selected based on a frequency band of RF signals desired for radiating and receiving at the motor feed antenna 200. In further embodiments, the values of the electrical components of the motor feed antenna 200 may be selected based on a plurality of frequency bands (e.g. both 2.4 GHz and 5 GHz) of RF signals desired for radiating and receiving at the motor feed antenna 200.

According to some embodiments, the motor feed antenna 200, serving as a wireless antenna for receiving and transmitting RF signals, may radiate the RF signals in all directions around the arm 104. In some embodiments, the radiation pattern of the motor feed antenna 200 may be similar to that of a conventional dipole antenna. For example, a radiation pattern of the motor feed antenna 200 may look like a sphere with a null along the length of the arm 104 (e.g., along the length of the motor feed antenna 200) and through the center of the sphere.

According to some embodiments, a UAV may have a form factor so small that the motor feed antenna 200 will not fit on one of the arms 104 of the UAV 100. In this case (or in other suitable embodiments), the motor 105 itself (e.g., a coil at the motor 105) may be connected as part of the length of the wireless antenna. In such embodiments, the traps 308 at the second ends of the conductive traces 310 may be omitted, so that the RF signal supplied from the RF signal port 304 may be transmitted to the motor 105.

Figure 4:
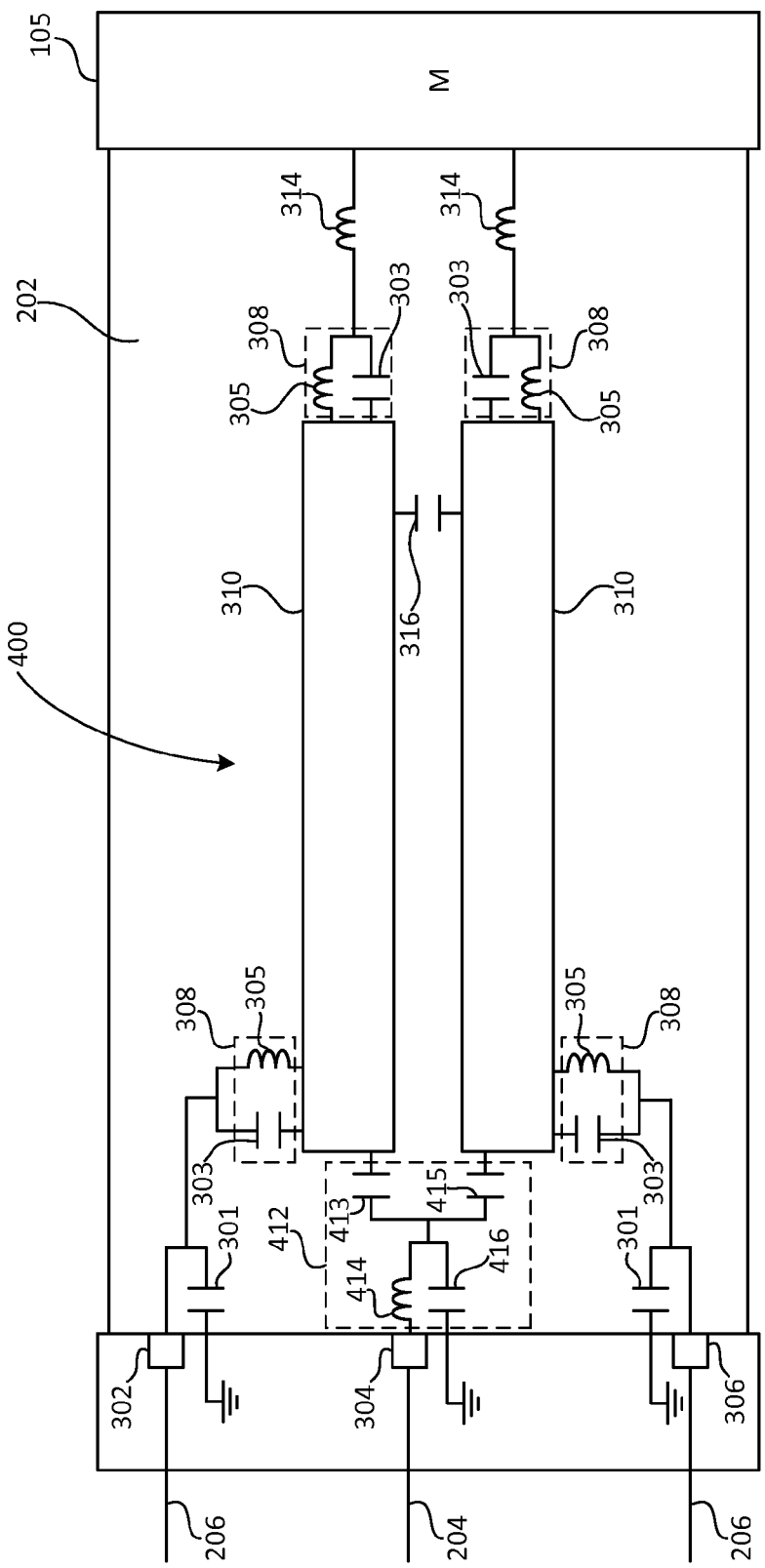
FIG. 4 illustrates a schematic view of another example of a motor feed antenna according to various embodiments.

FIG. 4 illustrates a schematic view of another example of a motor feed antenna 400 according to various embodiments. With reference to FIGS. 1-4, the motor feed antenna 400 is similar to the motor feed antenna 200, but includes an RF signal feed 412 that is different from the RF signal feed 312. According to some embodiments, the RF signal feed 412 includes capacitors 413 and 415 (a pair of capacitors 413 and 415, each having one terminal connected to a respective conductive trace 310 and another terminal connected to another capacitor 416), and may further include an inductor 414 connected to the RF signal port 304, between the RF signal port 304 and the capacitors 413 and 415 of the RF signal feed 412. Further, an additional capacitor 416 may be located in parallel with the inductor 414 connected to the RF signal port 304. In other words, the inductor 414 and the capacitor 416 connected in parallel may be located between the RF signal port 304 and the conductive traces 310. The inductor 414 and the capacitor 416 at the RF signal feed 412 may be selected and configured to serve as a matching circuit for improving impedance match at the motor feed antenna 400. According to further embodiments, other suitable combinations of inductors and capacitors in parallel and/or in series, or other electrical circuits and configurations of electrical components may be utilized to achieve a desired impedance match at the motor feed antenna 400.

Figure 5:
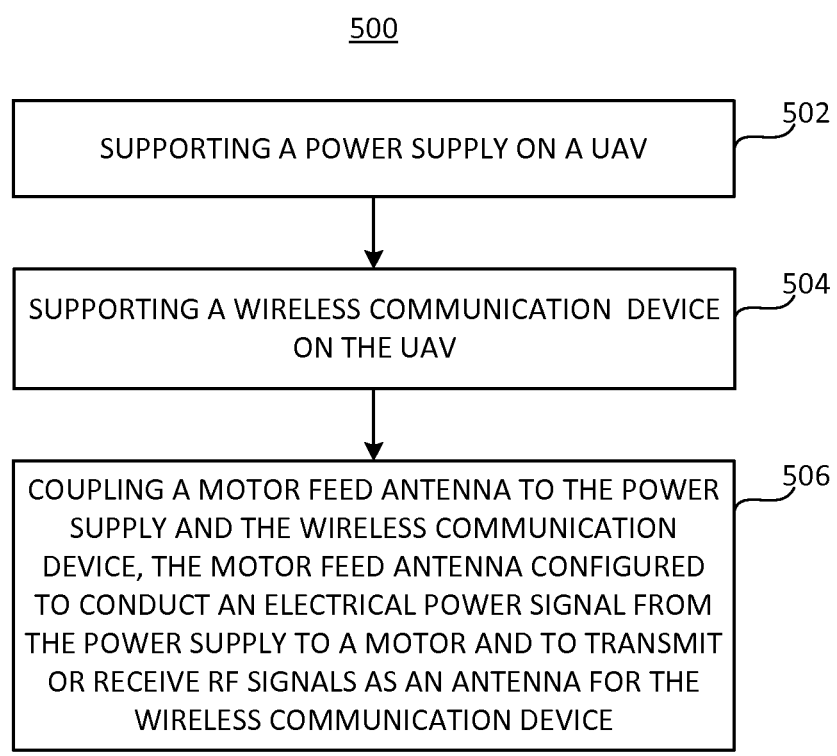
FIG. 5 illustrates an example of a method of manufacturing a motor feed antenna according to various embodiments.

FIG. 5 illustrates an example of a method 500 of manufacturing a motor feed antenna 200 and 400 (FIGS. 2 and 4) according to various embodiments. Referring to FIGS. 1-5, at block 502, the method 500 includes supporting a power supply 201 on a UAV 100. At block 504, the method 500 includes supporting a wireless communication device 203 on the UAV 100. At block 506, the method 500 includes coupling a motor feed antenna 200 to the power supply 201 and the wireless communication device 203, the motor feed antenna 200 configured to conduct an electrical power signal from the power supply 201 to a motor 105 and to transmit or receive RF signals as an antenna for the wireless communication device 203.

Figure 6:
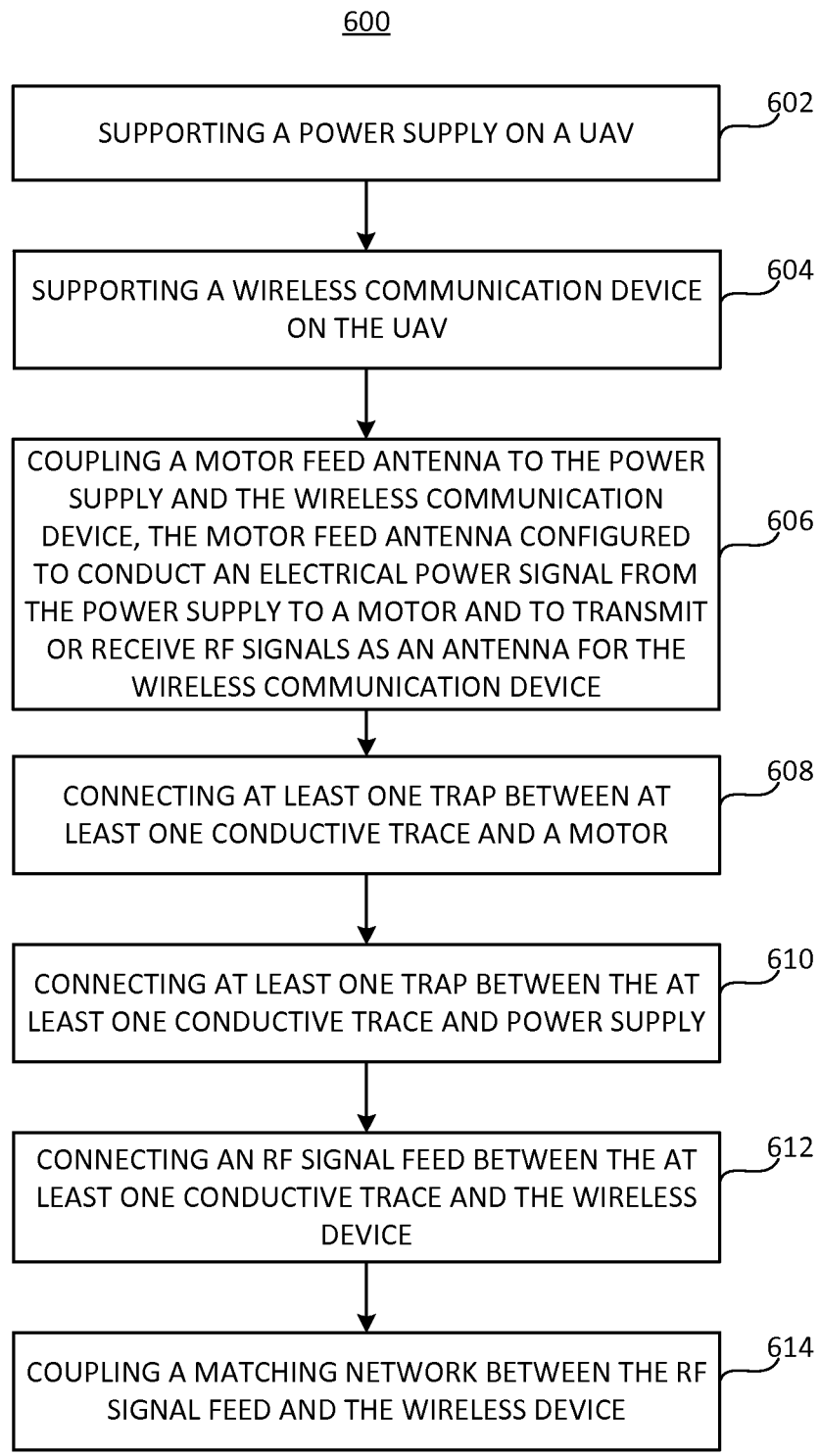
FIG. 6 illustrates another example of a method of manufacturing a motor feed antenna according to various embodiments.

FIG. 6 illustrates another example of a method 600 of manufacturing a motor feed antenna 200 and 400 (FIGS. 2 and 4) according to various embodiments. Referring to FIGS. 1-6, blocks 602, 604, and 606 correspond to blocks 502, 504, and 506 of the method 500.

As discussed above, the motor feed antenna 200 may include at least one conductive trace 310. At block 608, the method 600 includes connecting at least one trap 308 between the at least one conductive trace 310 and the motor 105 of the UAV 100, for blocking passage of RF signals. At block 610, the method 600 includes connecting at least one trap 308 between the at least one conductive trace 310 and the power supply 201, for blocking passage of RF signals. At block 612, the method 600 includes connecting an RF signal feed 312 between the at least one conductive trace 310 and the wireless communication device 203. At block 614, the method 600 includes coupling an impedance matching circuit between the RF signal feed 312 and the wireless communication device 203. According to some embodiments, as discussed above, the matching circuit may include an inductor 414 and a capacitor 416 connected in parallel.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some example embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

What is claimed is:

1. An unmanned vehicle comprising:
    a motor coupled to a propulsion system for propelling the unmanned vehicle;
    a power supply configured to supply an electrical power signal to the motor;
    a wireless communication device configured to transmit or receive a radio frequency (RF) signal; and
    a motor feed antenna coupled to the power supply and the wireless communication device, the motor feed antenna configured to conduct the electrical power signal from the power supply to the motor, and to transmit or receive RF signals as an antenna for the wireless communication device.

2. The unmanned vehicle of claim 1, wherein the motor feed antenna comprises at least one conductive trace having a first end coupled to both the power supply and the wireless communication device, and a second end coupled to the motor.

3. The unmanned vehicle of claim 2, wherein a length of the at least one conductive trace is selected based on a frequency of the RF signals.

4. The unmanned vehicle of claim 2, wherein the motor feed antenna further comprises at least one of:
- at least one trap coupled between the at least one conductive trace and the power supply, the at least one trap configured to allow the electrical power signal to pass to the at least one conductive trace and to block an RF signal received by the motor feed antenna from passing to the power supply; or
- at least one trap coupled between the at least one conductive trace and the motor, the at least one trap configured to allow the electrical power signal to pass to the motor and to block an RF signal transmitted by the wireless communication device from passing to the motor.

5. The unmanned vehicle of claim 4, wherein the at least one conductive trace is further directly coupled to a coil of the motor such that the coil of the motor and the at least one conductive trace of the motor feed antenna are together configured to transmit or receive the RF signals as the antenna for the wireless communication device.

6. The unmanned vehicle of claim 2, wherein the motor feed antenna further comprises an RF signal feed coupled between the at least one conductive trace and the wireless communication device, the RF signal feed configured to allow an RF signal transmitted by the wireless communication device to pass and to block the electrical power signal from passing to the wireless communication device.

7. The unmanned vehicle of claim 6, wherein the RF signal feed comprises a capacitor.

8. The unmanned vehicle of claim 6, wherein the motor feed antenna further comprises an impedance matching circuit coupled between the RF signal feed and the wireless communication device, the impedance matching circuit comprising an inductor and a capacitor connected in parallel.

9. The unmanned vehicle of claim 6, wherein a combined length of the at least one conductive trace and the RF signal feed is selected based on a frequency of the RF signals.

10. The unmanned vehicle of claim 1, wherein the motor feed antenna further comprises at least one conductive trace and at least one trap coupled between an end of the conductive trace and the motor, the at least one trap configured to allow the electrical power signal to pass to the motor and to block an RF signal transmitted by the wireless communication device from passing to the motor, the at least one trap including a capacitor and an inductor coupled in parallel, the unmanned vehicle further comprising a second inductor coupled in series with and between the one end of the at least one trap and the motor.

11. The unmanned vehicle of claim 1, wherein the electrical power signal is a differential direct current (DC) power signal having a high level DC signal component and a low level DC signal component.

12. The unmanned vehicle of claim 11,
wherein the motor feed antenna comprises at least one conductive trace having a first end coupled to both the power supply and the wireless communication device, and a second end coupled to the motor;
wherein the at least one conductive trace comprises a plurality of conductive traces, each of the conductive traces having a first end coupled to both the power supply and the wireless communication device, and a second end coupled to the motor; and
wherein a first trace of the conductive traces is configured to deliver the high level DC signal component to the motor, and a second trace of the conductive traces is configured to deliver the low level DC signal component to the motor.

13. The unmanned vehicle of claim 1,
wherein the wireless communication device is configured to transmit or receive a plurality of RF signals; and
wherein each of the RF signals corresponds to a different frequency band.

14. The unmanned vehicle of claim 1, further comprising:
a main body for housing the power supply and the wireless communication device;
a propeller configured to be driven by the motor; and
an arm for supporting the motor feed antenna, the arm having a first end attached to the main body and a second end attached to the motor, the arm holding the motor at a location separated from the main body by at least a portion of the length of the arm.

15. The unmanned vehicle of claim 1, further comprising an arm holding the propulsion system, the motor feed antenna extending along at least a portion of the arm.

16. The unmanned vehicle of claim 15, wherein the arm has a first end attached to a main body and a second end attached to the motor, the arm holding the motor at a location separated from the main body by at least a portion of the length of the arm.

17. The unmanned vehicle of claim 16, wherein the main body holds at least one of the power supply or the wireless communication device.

18. The method of claim 1, wherein the motor feed antenna is configured to transmit and receive RF signals as an antenna for the wireless communication device.

19. A method of manufacturing an unmanned vehicle, the method comprising:
providing a motor coupled to a propulsion system for propelling the unmanned vehicle;
supporting a power supply on a body of the unmanned vehicle, the power supply configured to supply an electrical power signal to the motor;
supporting a wireless communication device on the body of the unmanned vehicle, the wireless communication device configured to transmit or receive a radio frequency (RF) signal; and
coupling a motor feed antenna to the power supply and the wireless communication device, the motor feed antenna configured to conduct the electrical power signal from the power supply to the motor, and to transmit or receive RF signals as an antenna for the wireless communication device.

20. The method of claim 19, wherein the motor feed antenna comprises at least one conductive trace having a first end coupled to both the power supply and the wireless communication device, and a second end coupled to the motor.

21. The method of claim 20, wherein a length of the at least one conductive trace is selected based on a frequency of the RF signals.

22. The method of claim 20, further comprising at least one of:
connecting at least one trap between the at least one conductive trace and the power supply, the at least one trap configured to allow the electrical power signal to pass to the at least one conductive trace and to block an RF signal received by the motor feed antenna from passing to the power supply; or
connecting at least one trap between the at least one conductive trace and the motor, the at least one trap configured to allow the electrical power signal to pass to the motor and to block an RF signal transmitted by the wireless communication device from passing to the motor.

23. The method of claim 22, further comprising directly coupling a coil of the motor to the at least one conductive trace such that the coil of the motor such that the coil of the motor and the at least one conductive trace of the motor feed antenna are together configured to transmit or receive the RF signals as the antenna for the wireless communication device.

24. The method of claim 20, further comprising connecting an RF signal feed between the at least one conductive trace and the wireless communication device, the RF signal feed configured to allow an RF signal transmitted by the wireless communication device to pass and to block the electrical power signal from passing to the wireless communication device.

25. The method of claim 24, further comprising coupling an impedance matching circuit between the RF signal feed and the wireless communication device, the impedance matching circuit comprising an inductor and a capacitor connected in parallel.

26. The method of claim 24, wherein a combined length of the at least one conductive trace and the RF signal feed is selected based on a frequency of the RF signals.

27. The method of claim 19, further comprising providing at least one conductive trace and connecting at least one trap between an end of the conductive trace and the motor, the at least one trap configured to allow the electrical power signal to pass to the motor and to block an RF signal transmitted by the wireless communication device from passing to the motor, the at least one trap including a capacitor and an inductor coupled in parallel, the unmanned vehicle further comprising a second inductor coupled in series with and between the one end of the at least one trap and the motor.

28. The method of claim 19, wherein the electrical power signal is a differential direct current (DC) power signal having a high level DC signal component and a low level DC signal component.

29. The method of claim 28,
wherein the motor feed antenna comprises at least one conductive trace having a first end coupled to both the power supply and the wireless communication device, and a second end coupled to the motor;
wherein the at least one conductive trace comprises a plurality of conductive traces, each of the conductive traces having a first end coupled to both the power supply and the wireless communication device, and a second end coupled to the motor; and
wherein a first trace of the conductive traces is configured to deliver the high level DC signal component to the motor, and a second trace of the conductive traces is configured to deliver the low level DC signal component to the motor.

* * * * *